(12) United States Patent
Soto

(10) Patent No.: US 12,434,375 B2
(45) Date of Patent: Oct. 7, 2025

(54) CREEPER HEADREST ATTACHMENT SYSTEM

(71) Applicant: Salvador Soto, San Antonio, TX (US)

(72) Inventor: Salvador Soto, San Antonio, TX (US)

( * ) Notice: Subject to any disclaimer, the term of this patent is extended or adjusted under 35 U.S.C. 154(b) by 318 days.

(21) Appl. No.: 18/126,982

(22) Filed: Mar. 27, 2023

(65) Prior Publication Data

US 2024/0326234 A1    Oct. 3, 2024

(51) Int. Cl.
| | | |
|---|---|---|
| B25H 5/00 | (2006.01) | |
| F21L 4/02 | (2006.01) | |
| F21L 4/08 | (2006.01) | |

(52) U.S. Cl.
CPC .................. B25H 5/00 (2013.01); F21L 4/02 (2013.01); F21L 4/08 (2013.01)

(58) Field of Classification Search
CPC ..... B25H 5/00; F21L 4/02; F21L 4/08; B60Q 1/0017
See application file for complete search history.

(56) References Cited

U.S. PATENT DOCUMENTS

| | | | | |
|---|---|---|---|---|
| 2,291,094 A | * | 7/1942 | McCarthy ................ | B25H 5/00 280/32.6 |
| 2,475,266 A | * | 7/1949 | Williams ................. | B25H 5/00 219/217 |
| 2,636,705 A | | 4/1953 | Stanton | |
| 4,698,731 A | * | 10/1987 | Johns, Sr. ................ | B25H 5/00 362/486 |
| 4,986,558 A | | 1/1991 | Morris | |
| 5,174,592 A | * | 12/1992 | Pool ........................ | B25H 5/00 280/32.6 |
| 5,330,211 A | | 7/1994 | Nicholson | |
| 5,863,053 A | * | 1/1999 | Berry ....................... | B25H 5/00 280/32.6 |
| 6,238,069 B1 | * | 5/2001 | Miles ....................... | B25H 5/00 362/225 |
| 6,902,174 B2 | * | 6/2005 | Hernandez ............... | B25H 5/00 280/32.6 |
| 7,032,908 B2 | | 4/2006 | Melvin | |
| 8,403,524 B2 | * | 3/2013 | Prosey ..................... | F21V 3/04 280/32.6 |
| 8,820,755 B1 | * | 9/2014 | Whiteside ................ | B25H 5/00 280/32.6 |
| 9,623,551 B1 | * | 4/2017 | Bowen ..................... | B25H 5/00 |
| 9,802,308 B2 | | 10/2017 | Coutts | |
| 9,925,659 B1 | | 3/2018 | Clemmer | |
| D856,621 S | | 8/2019 | Liu | |

(Continued)

FOREIGN PATENT DOCUMENTS

| | | | | |
|---|---|---|---|---|
| CA | 2508191 A1 | * | 10/2006 | ............... B25H 5/00 |
| CN | 108515506 A | * | 9/2018 | |
| WO | WO2017223448 | | 12/2017 | |

*Primary Examiner* — Steve Clemmons

(57) ABSTRACT

A creeper headrest attachment system for providing a headrest and emitting light when turned on includes a creeper being defined by a cart being positionable underneath a vehicle. The creeper includes a frame, a plurality of wheels being rotatably connected to the frame, and a headrest being attached to the frame. A base has an upper surface, a lower surface, and a boundary edge. A head support is mounted on the base. A mount is attached to the base and mounts the base to the creeper. A light emitting assembly is attached to the base and emits light when turned on.

12 Claims, 8 Drawing Sheets

(56) References Cited

U.S. PATENT DOCUMENTS

| | | | |
|---|---|---|---|
| 11,267,382 B2* | 3/2022 | Clough | B60N 2/885 |
| 11,396,251 B2* | 7/2022 | Clough | B60N 2/242 |
| 11,458,613 B2* | 10/2022 | Martin | B25H 5/00 |
| 11,628,555 B1* | 4/2023 | Williams | B25H 5/00 |
| | | | 280/32.6 |
| 11,969,875 B1* | 4/2024 | Gess | F21V 33/00 |
| 12,109,679 B2* | 10/2024 | Obitts | B25H 5/00 |
| 2004/0100048 A1* | 5/2004 | Deasy | B25H 5/00 |
| | | | 280/32.6 |
| 2014/0027990 A1* | 1/2014 | Triglia | B62B 3/00 |
| | | | 362/183 |
| 2016/0096265 A1* | 4/2016 | Scott | B25H 5/00 |
| | | | 280/32.6 |
| 2017/0368677 A1 | 12/2017 | Rotenberg | |
| 2021/0338498 A1* | 11/2021 | Schwab | B25H 5/00 |
| 2023/0219211 A1* | 7/2023 | Obitts | B25H 5/00 |
| | | | 280/32.6 |
| 2024/0375265 A1* | 11/2024 | Valencia | F21V 33/008 |

\* cited by examiner

CREEPER HEADREST ATTACHMENT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

Background of the Invention

(1) Field of the Invention

The disclosure relates to creeper attachments and more particularly pertains to a new creeper attachment for providing a headrest and emitting light when turned on.

(2) Description of Related Art Including Information Disclosed Under 37 CFR 1.97 and 1.98

The prior art relates to creeper attachments and includes a variety of creeper attachments being mounted to a creeper and emitting light when turned on. Known prior art does not include a creeper attachment having a head support mounted thereto and emitting light when turned on.

BRIEF SUMMARY OF THE INVENTION

An embodiment of the disclosure meets the needs presented above by generally comprising a creeper being defined by a cart being positionable underneath a vehicle. The creeper includes a frame, a plurality of wheels being rotatably coupled to the frame, and a headrest being removably coupled to the frame. A base has an upper surface, a lower surface, and a boundary edge. A head support is mounted on the base. A mount is coupled to the base and mounts the base to the creeper. A light emitting assembly is coupled to the base and emits light when turned on.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
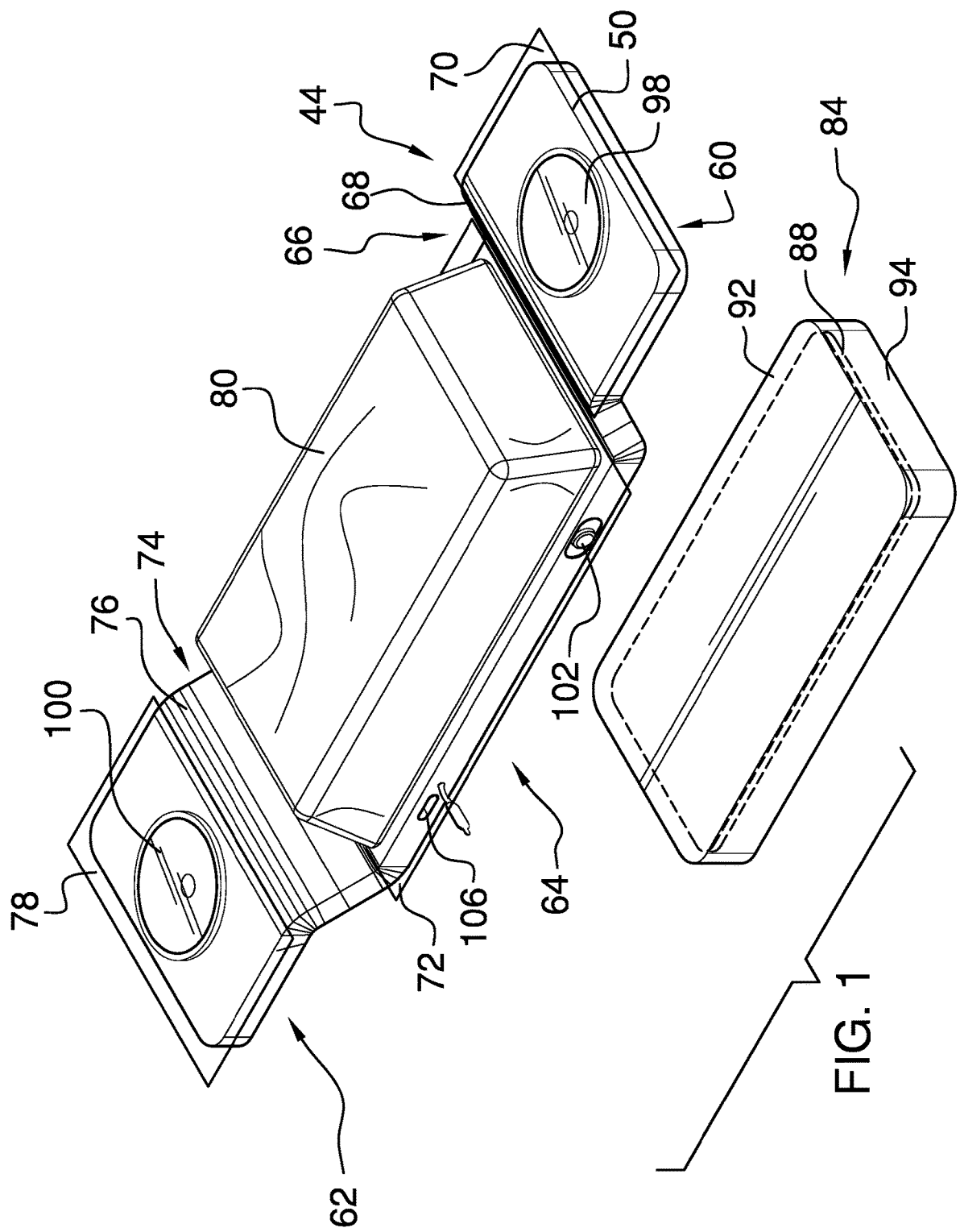
FIG. 1 is a top isometric view of a creeper headrest attachment system according to an embodiment of the disclosure.
Figure 2:
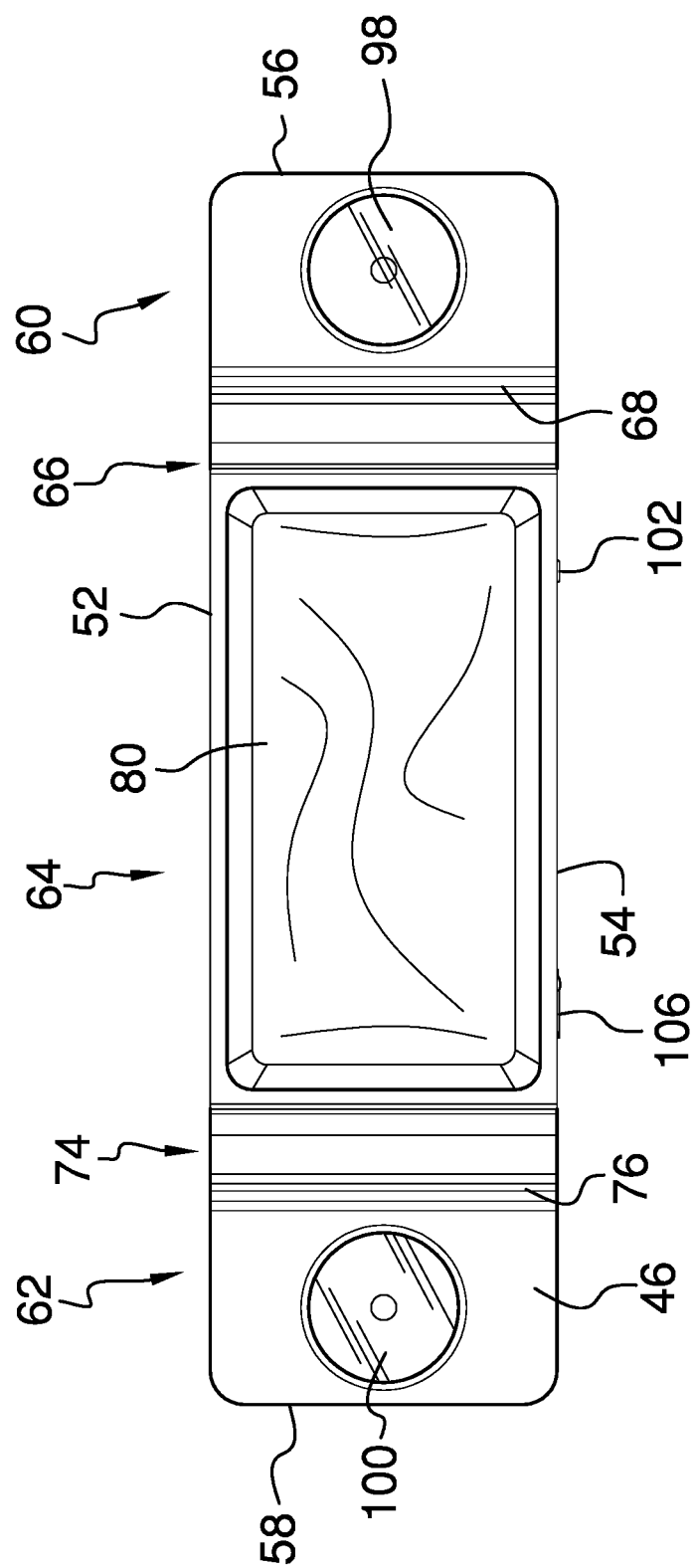
FIG. 2 is a top view of an embodiment of the disclosure.
Figure 3:
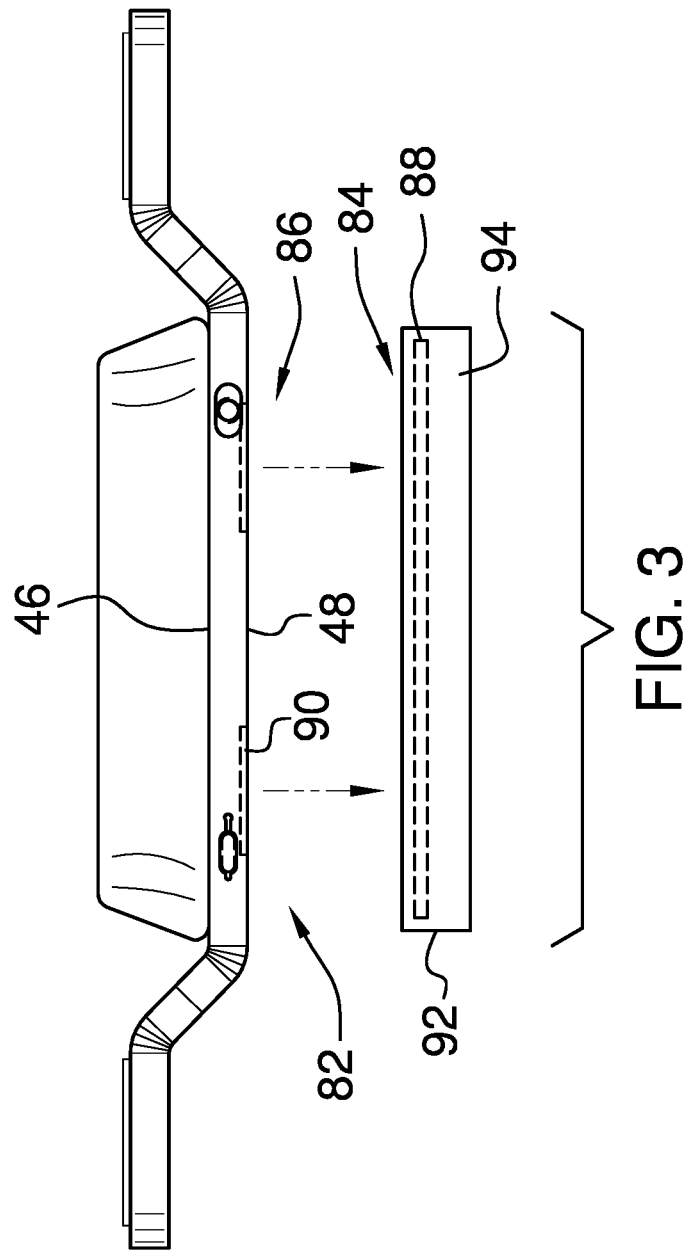
FIG. 3 is a front view of an embodiment of the disclosure.
Figure 4:
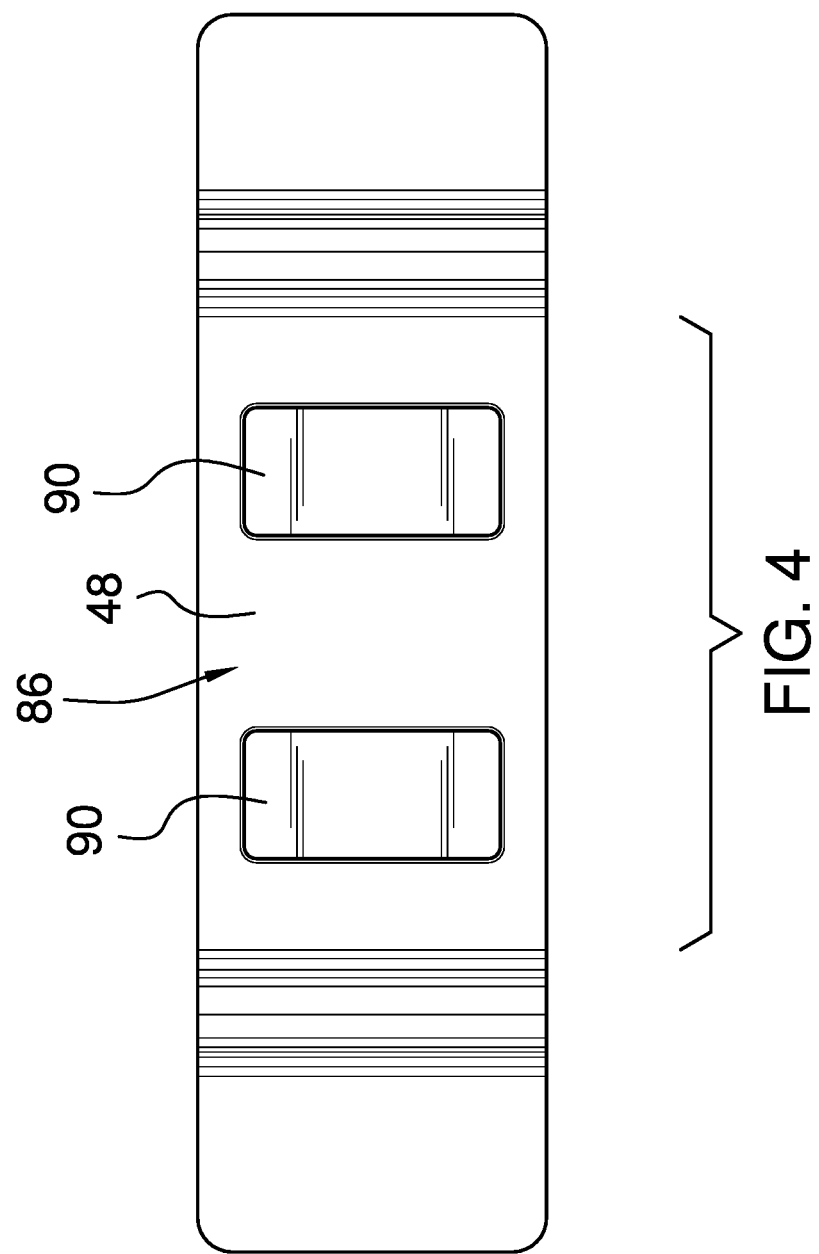
FIG. 4 is a side view of an embodiment of the disclosure.
Figure 5:
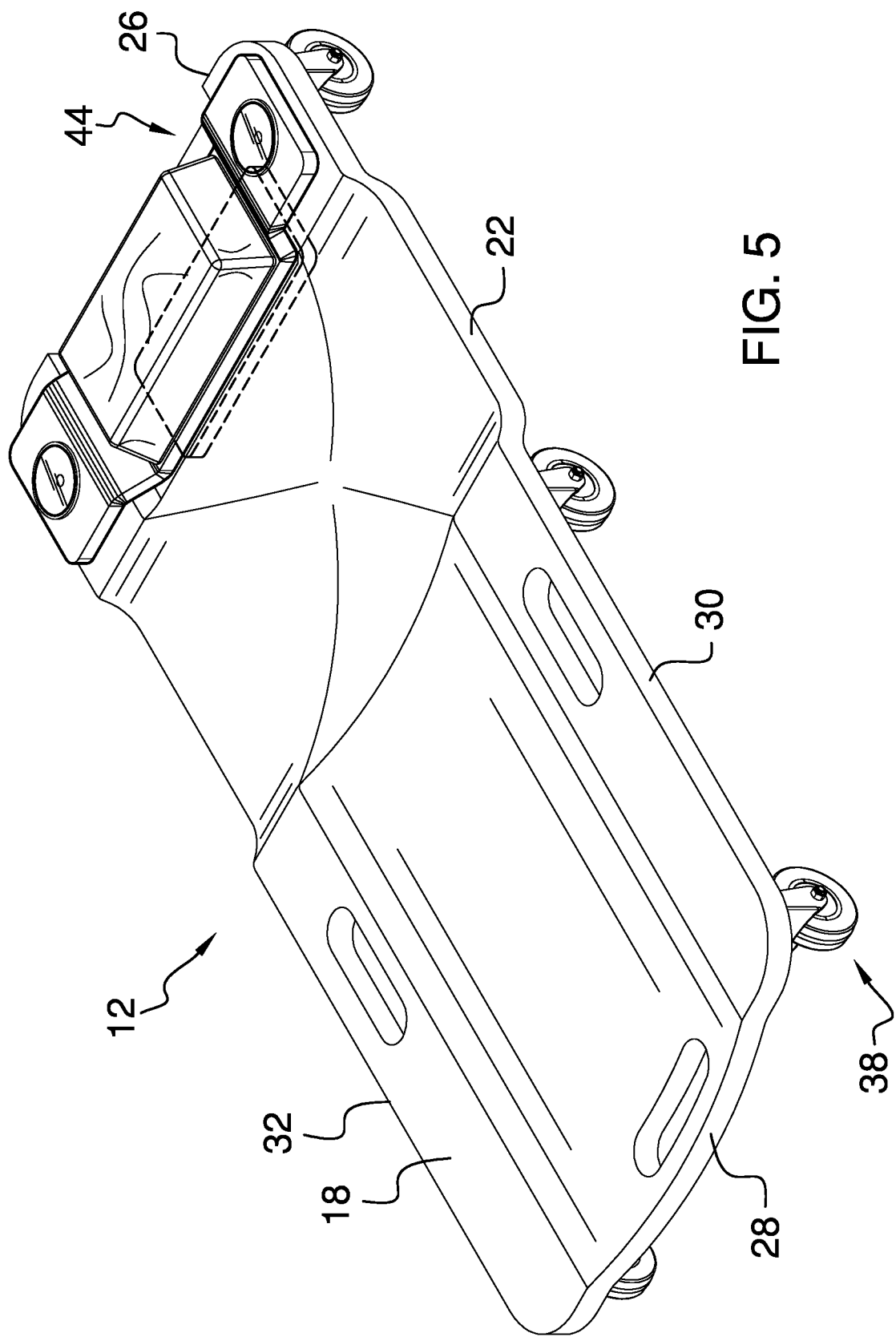
FIG. 5 is an in-use view of an embodiment of the disclosure.
Figure 6:
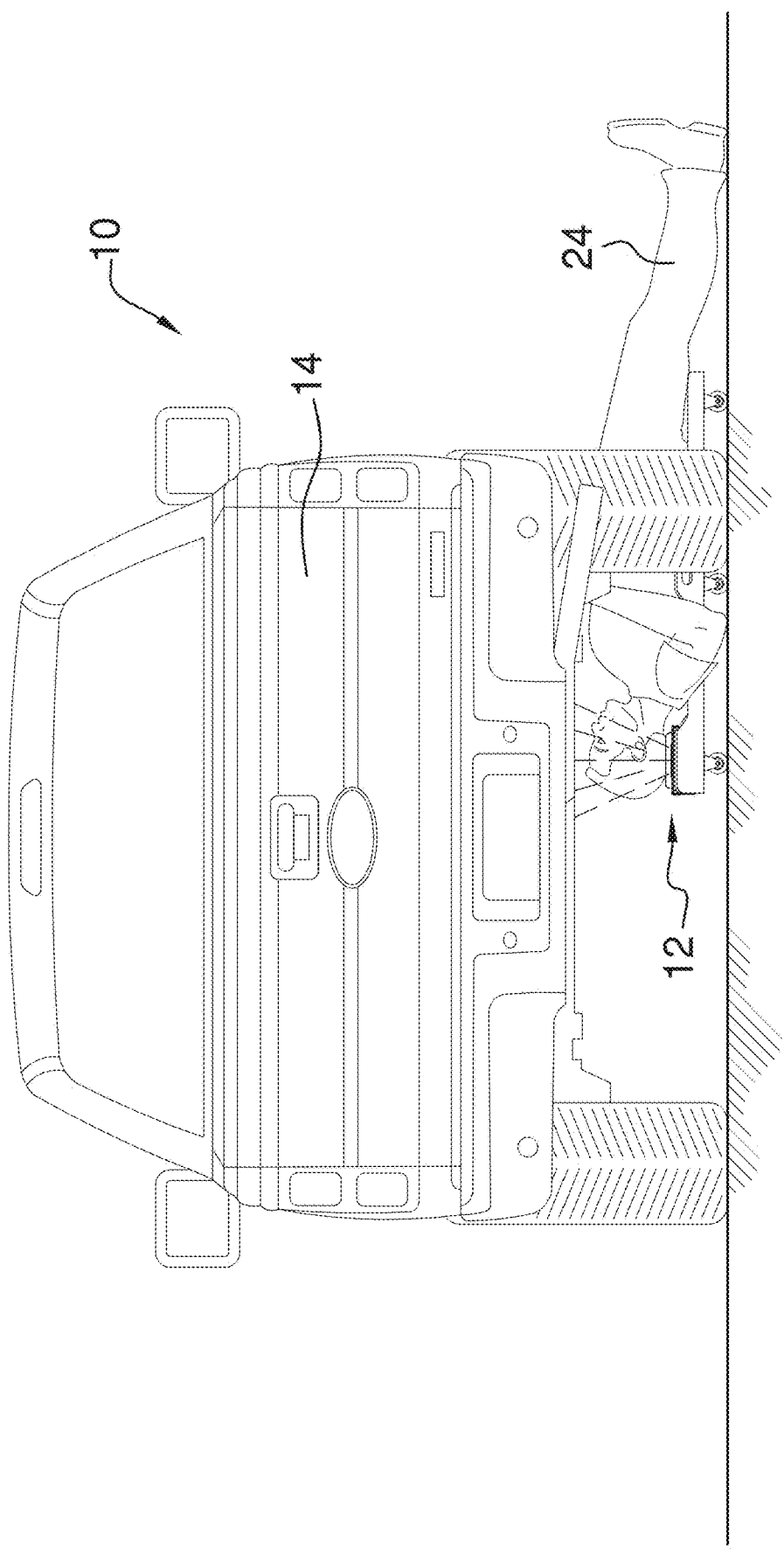
FIG. 6 is an in-use view of an embodiment of the disclosure.
Figure 7:
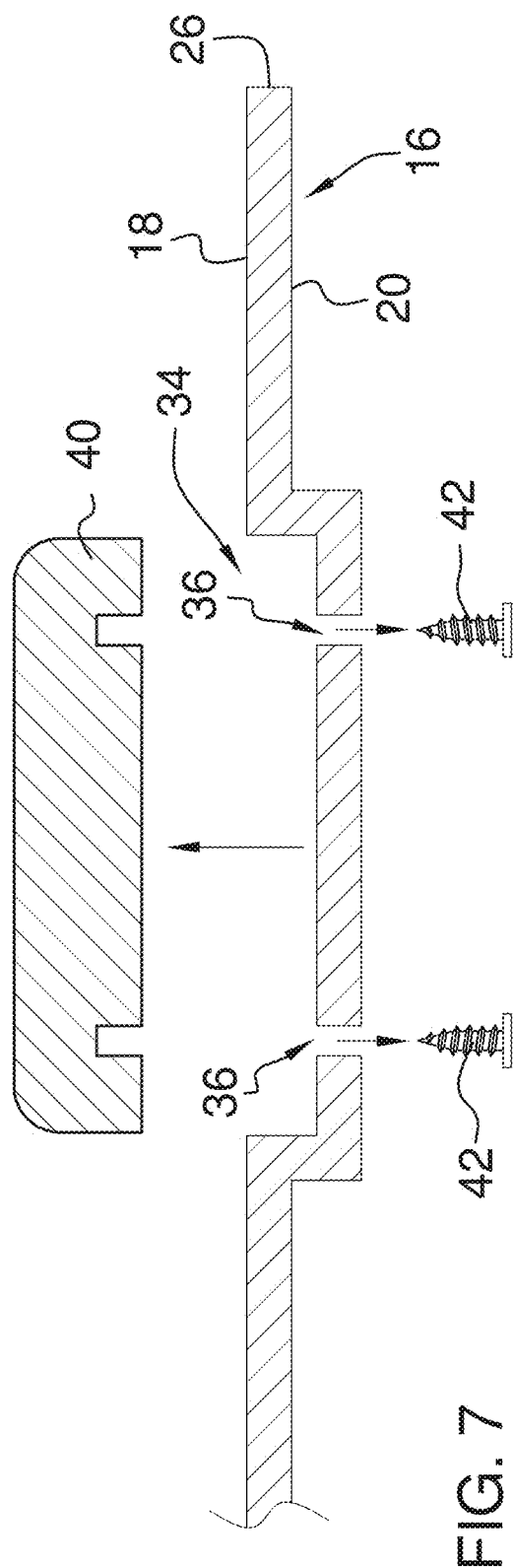
FIG. 7 is a sectional view of an embodiment of the disclosure.
Figure 8:
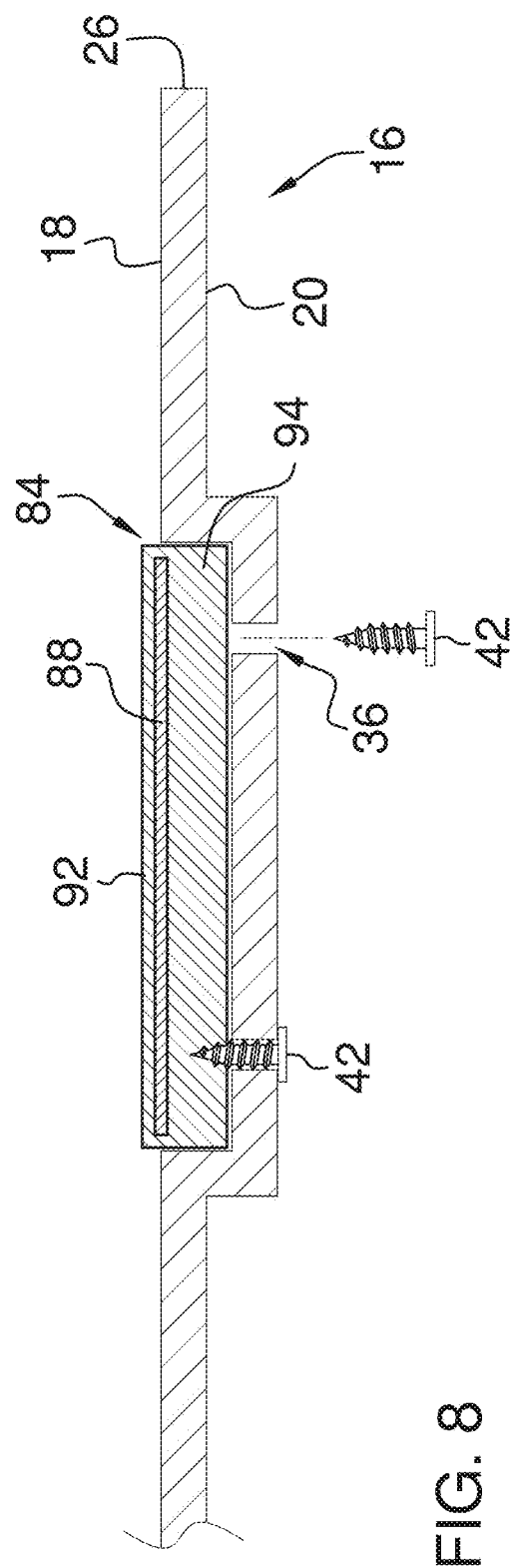
FIG. 8 is a sectional view of an embodiment of the disclosure.
Figure 9:
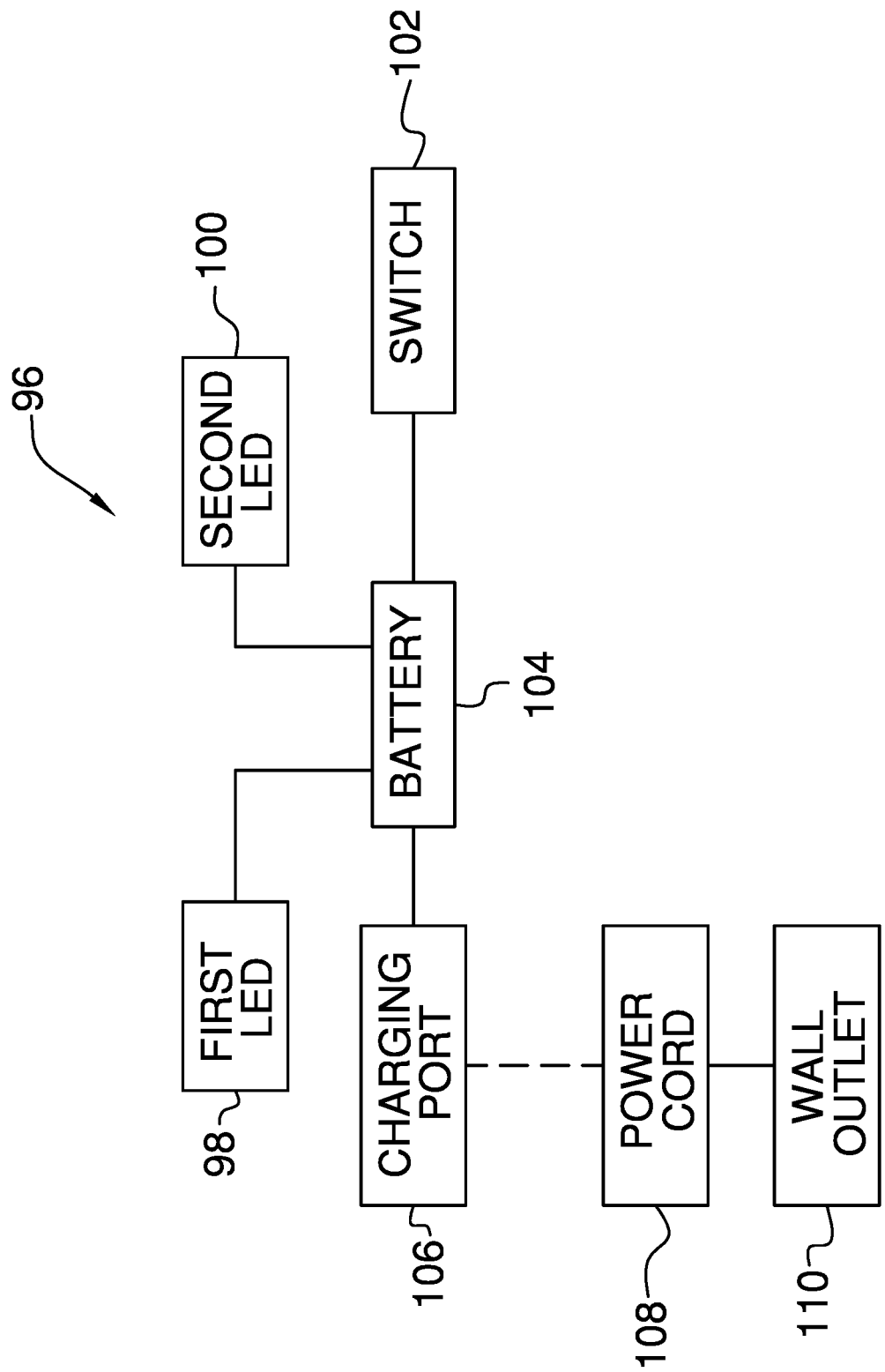
FIG. 9 is a block diagram view of an embodiment of the disclosure.

With reference now to the drawings, and in particular to FIGS. 1 through 9 thereof, a new creeper attachment embodying the principles and concepts of an embodiment of the disclosure and generally designated by the reference numeral 10 will be described.

As best illustrated in FIGS. 1 through 9, the creeper headrest attachment system generally comprises a creeper 12 being defined by a cart being positionable underneath a vehicle 14. The creeper 12 includes a frame 16 having a top surface 18, a bottom surface 20, and a perimeter edge 22. The top surface 18 is configured for receiving a person 24 in a supine position thereon. The perimeter edge 22 includes a front edge 26, a back edge 28, a first side edge 30, and a second side edge 32. The first side edge 30 and the second side edge 32 are normally elongated. The frame 16 has a cutout 34 extending therethrough and may be positioned proximate to the front edge 26. The cutout 34 has a rectangular configuration. The frame 16 has a plurality of holes 36 extending through the cutout 34.

A plurality of wheels 38 is rotatably coupled to the frame 16. Each of the wheels 38 is mounted to the bottom surface 20 of the frame 16. A headrest 40 is removably coupled to the frame 16. The headrest 40 may be removably mounted within the cutout 34 of the top surface 18 of the frame 16 and a plurality of screws 42 may couple the headrest 40 to the frame 16. Each of the holes 36 of the frame 16 may receive one of the plurality of screws 42 from the bottom surface 20 into the headrest 40 positioned within the cutout 34. The screws 42 may be removed from the holes 36 prior to removing the headrest 40 from the cutout 34 of the frame 16.

A base 44 has an upper surface 46, a lower surface 48, and a boundary edge 50. The boundary edge 50 includes a forward edge 52, a rear edge 54, a first lateral edge 56, and a second lateral edge 58. The forward edge 52 and the rear edge 54 are parallel to each other and are elongated from the first lateral edge 56 to the second lateral edge 58. The base 44 has a first section 60, a second section 62, and a center section 64 is positioned between the first 60 and second 62 sections. The first section 60 has the first lateral edge 56, and the second section 62 has the second lateral edge 58. A first juncture 66 between the first section 60 and the center section 64 normally comprises a first pivoting member 68 of the base 44, wherein a first plane 70 of the upper surface 46 of the first section 60 is adjustably positioned relative to a center plane 72 of the upper surface 46 of the center section 64. A second juncture 74 between the second section 62 and the center section 64 comprise a second pivoting member 76 of the base 44, wherein a second plane 78 of the upper surface 46 of the second section 62 is adjustably positioned relative to a center plane 72 of the upper surface 46 of the center section 64 such that the center section 64 is static relative to the first 60 and second 62 sections.

A head support 80 is mounted on the base 44. The head support 80 is attached to the upper surface 46 of the center section 64 and is equally spaced between the forward edge 52 and the rear edge 54. The head support 80 comprises a cushion being resiliently compressible. A mount 82 is coupled to the base 44 and mounts the base 44 to the creeper 12. The mount 82 includes a first mating member 84 and a second mating member 86. The first mating member 84 is attachable to the top surface 18 of the frame 16 and the second mating member 86 is mounted to the lower surface 48 of the base 44 and removably couples to the first mating member 84. The first mating member 84 comprises a magnetic plate 88 being positionable within the cutout 34 of the frame 16. The second mating member 86 comprises at least one magnetic strip 90 being magnetically engageable with the magnetic plate 88. The magnetic plate 88 has a covering 92 thereon. The covering 92 has a bottom layer 94 protruding outwardly from the magnetic plate 88 and may be penetrable by the plurality of screws 42. The bottom layer 94 may comprise a 0.50-inch-thick plastic and the bottom layer 94 may be penetrated by the plurality of screws 42 when the magnetic plate 88 is positioned within the cutout 34 of the frame 16 of the creeper 12, wherein the screws 42 retain the magnetic plate 88 within the cutout 34.

A light emitting assembly 96 is coupled to the base 44 and emits light when turned on. The light emitting assembly 96 comprises one or more light emitters being mounted to the upper surface 46 of the base 44. The light emitting assembly 96 includes a first light emitter 98 and a second light emitter 100. The first light emitter 98 is mounted to the upper surface 46 of the first section 60 of the base 44 and the second light emitter 100 is mounted to the upper surface 46 of the second section 62 of the base 44, wherein the first light emitter 98 and the second light emitter 100 are turned on to emit light upwardly from the upper surface 46 of the base 44.

A switch 102 is electrically coupled to the first light emitter 98 and the second light emitter 100. The switch 102 is actuated to turn on and off the first light emitter 98 and second light emitter 100. The switch 102 is mounted on the base 44 and may be positioned on the rear edge 54 of the base 44. A power supply 104 is electrically coupled to the first light emitter 98 and the second light emitter 100. The power supply 104 is a rechargeable battery and may be coupled to the base 44. A power port 106 is electrically coupled to the power supply 104 and is configured for receiving a power cord 108 of an electricity source 110. The power port 106 is typically mounted to the base 44. The power port 106 may comprise a universal serial bus port or any conventional power port 106 able to receive the power cord 108 of the electricity source 110.

In use, the headrest 40 is removed from the cutout 34 of the frame 16 prior to positioning the magnetic plate 88 within the cutout 34. Each of the screws 42 may be inserted through one of the plurality of holes 36 of the cutout 34 into the bottom layer 94 of the magnetic plate 88 to facilitate retaining the magnetic plate 88 within the cutout 34. The magnetic strip 90 of the base 44 magnetically attaches to the magnetic plate 88 to retain the base 44 to the frame 16. The first section 60 and the second section 62 may be positionally adjusted relative to the center section 64 to contour the lower surface 48 of the base 44 to the top surface 18 of the frame 16. The person 24 using the creeper 12 may supinely position on the top surface 18 of the frame 16 and a head of the person 24 may be positioned on the head support 80 of the base 44. The first light emitter 98 and the second light emitter 100 may be turned on by actuating the switch 102. The creeper 12 may be positioned underneath a bottom side of the vehicle 14 and the first 98 and second 100 light emitters may provide illumination to the bottom side of the vehicle 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A headrest attachment system comprising:
   a creeper being defined by a cart being positionable underneath a vehicle, said creeper including:
      a frame;
      a plurality of wheels being rotatably coupled to said frame; and
      a headrest being removably coupled to said frame;
   a base, said base having an upper surface, a lower surface, and a boundary edge;
   a head support being mounted on said base;
   a mount being coupled to said base and mounting said base to said creeper;
   a light emitting assembly being coupled to said base and emitting light when turned on; and
   wherein said boundary edge includes a forward edge, a rear edge, a first lateral edge, and a second lateral edge, said forward edge and said rear edge being parallel to each other and being elongated from said first lateral edge to said second lateral edge, said base having a first section, a second section, and a center section being positioned between said first and second sections, said first section having said first lateral edge and said second section having said second lateral edge, a first juncture between said first section and said center section comprising a first pivoting member of said base, wherein a first plane of said upper surface of said first section is adjustably positioned relative to a center plane of said upper surface of said center section, a second juncture between said second section and said center section comprising a second pivoting member of said base, wherein a second plane of said upper surface of said second section is adjustably positioned relative to a center plane of said upper surface of said center section such that said center section is static relative to said first and second sections.

2. The headrest attachment system of claim 1, wherein said frame has a top surface, a bottom surface, and a perimeter edge, said top surface being configured for receiving a person in a supine position thereon, said perimeter edge including a front edge, a back edge, a first side edge, and a second side edge, said first side edge and said second side edge being elongated, said frame having a cutout extending therethrough, said cutout being positioned proximate to said front edge, said cutout having a rectangular configuration, said frame having a plurality of holes extending through said cutout.

3. The headrest attachment system of claim 2, wherein each of said wheels is mounted to said bottom surface of said frame.

4. The headrest attachment system of claim 2, wherein said headrest is removably mounted within said cutout of said top surface of said frame.

5. The headrest attachment system of claim 4, further including a plurality of screws coupling said headrest to said frame, each of said holes of said frame receiving one of said plurality of screws from said bottom surface into said headrest positioned within said cutout.

6. The headrest attachment system of claim 2, wherein said mount includes a first mating member and a second mating member, said first mating member being attachable to said top surface of said frame, said second mating member being mounted to said lower surface of said base and removably coupling to said first mating member, said first mating member comprising a magnetic plate being positionable within said cutout of said frame, said second mating member comprising at least one magnetic strip, said magnetic plate having a covering thereon, said covering having a bottom layer protruding outwardly from said magnetic plate and being penetrable by said plurality of screws.

7. The headrest attachment system of claim 1, wherein said head support is attached to said upper surface of said center section and is equally spaced between said forward edge and said rear edge, said head support comprising a cushion, said cushion being resiliently compressible.

8. The headrest attachment system of claim 1, wherein said light emitting assembly comprises one or more light emitters being mounted to said upper surface of said base, said light emitting assembly including a first light emitter and a second light emitter, said first light emitter being mounted to said upper surface of said first section of said base, said second light emitter being mounted to said upper surface of said second section of said base.

9. The headrest attachment system of claim 8, further including a switch being electrically coupled to said first light emitter and said second light emitter, said switch being actuated to turn on and off said first and second light emitters, said switch being mounted on said base, said switch being positioned on said rear edge of said base.

10. The headrest attachment system of claim 9, further including a power supply being electrically coupled to said first light emitter and said second light emitter, said power supply being a rechargeable battery and being coupled to said base.

11. The headrest attachment system of claim 10, further including a power port being electrically coupled to said power supply and being configured for receiving a power cord of an electricity source, said power port being mounted to said base.

12. A headrest attachment system comprising:
a creeper being defined by a cart being positionable underneath a vehicle, said creeper including:
a frame, said frame having a top surface, a bottom surface, and a perimeter edge, said top surface being configured for receiving a person in a supine position thereon, said perimeter edge including a front edge, a back edge, a first side edge, and a second side edge, said first side edge and said second side edge being elongated, said frame having a cutout extending therethrough, said cutout being positioned proximate to said front edge, said cutout having a rectangular configuration, said frame having a plurality of holes extending through said cutout;
a plurality of wheels being rotatably coupled to said frame, each of said wheels being mounted to said bottom surface of said frame;
a headrest being removably coupled to said frame, said headrest being removably mounted within said cutout of said top surface of said frame; and
a plurality of screws coupling said headrest to said frame, each of said holes of said frame receiving one of said plurality of screws from said bottom surface into said headrest positioned within said cutout;
a base, said base having an upper surface, a lower surface, and a boundary edge, said boundary edge including a forward edge, a rear edge, a first lateral edge, and a second lateral edge, said forward edge and said rear edge being parallel to each other and being elongated from said first lateral edge to said second lateral edge, said base having a first section, a second section, and a center section being positioned between said first and second sections, said first section having said first lateral edge and said second section having said second lateral edge, a first juncture between said first section and said center section comprising a first pivoting member of said base, wherein a first plane of said upper surface of said first section is adjustably positioned relative to a center plane of said upper surface of said center section, a second juncture between said second section and said center section comprising a second pivoting member of said base, wherein a second plane of said upper surface of said second section is adjustably positioned relative to a center plane of said upper surface of said center section such that said center section is static relative to said first and second sections;
a head support being mounted on said base, said head support being attached to said upper surface of said center section and being equally spaced between said forward edge and said rear edge, said head support comprising a cushion, said cushion being resiliently compressible;
a mount being coupled to said base and mounting said base to said creeper, said mount including a first mating member and a second mating member, said first mating member being attachable to said top surface of said frame, said second mating member being mounted to said lower surface of said base and removably coupling to said first mating member, said first mating member comprising a magnetic plate being positionable within said cutout of said frame, said second mating member comprising at least one magnetic strip, said magnetic plate having a covering thereon, said covering having a bottom layer protruding outwardly from said magnetic plate and being penetrable by said plurality of screws;

a light emitting assembly being coupled to said base and emitting light when turned on, said light emitting assembly comprising:

one or more light emitters being mounted to said upper surface of said base, said light emitting assembly including a first light emitter and a second light emitter, said first light emitter being mounted to said upper surface of said first section of said base, said second light emitter being mounted to said upper surface of said second section of said base;

a switch being electrically coupled to said first light emitter and said second light emitter, said switch being actuated to turn on and off said first and second light emitters, said switch being mounted on said base, said switch being positioned on said rear edge of said base;

a power supply being electrically coupled to said first light emitter and said second light emitter, said power supply being a rechargeable battery and being coupled to said base; and a power port being electrically coupled to said power supply and being configured for receiving a power cord of an electricity source, said power port being mounted to said base.

* * * * *